United States Patent

Schuh

[19]

[11] Patent Number: 6,119,169
[45] Date of Patent: Sep. 12, 2000

[54] NETWORK SYSTEM HAVING A SECONDARY DISK DRIVE BYPASS CIRCUIT ACTIVATED WHEN ALL PRIMARY DISK DRIVE BYPASS CIRCUITS ARE ACTIVATED

[75] Inventor: Brian J. Schuh, Hopewell Junction, N.Y.

[73] Assignee: International Business Machines Corporation, Armonk, N.Y.

[21] Appl. No.: 09/005,615

[22] Filed: Jan. 9, 1998

[51] Int. Cl.⁷ .................................................. G06F 16/00
[52] U.S. Cl. ............................................ 709/239; 710/38
[58] Field of Search ................................ 709/239, 242, 709/220, 221, 234; 714/1–6; 710/38

[56] References Cited

U.S. PATENT DOCUMENTS

| 4,103,336 | 7/1978 | Gindi et al. . | |
|---|---|---|---|
| 4,224,684 | 9/1980 | Conner et al. | 710/220 |
| 4,491,838 | 1/1985 | West . | |
| 4,633,468 | 12/1986 | Skatrud et al. . | |
| 5,414,708 | 5/1995 | Webber et al. | 370/85.3 |
| 5,442,629 | 8/1995 | Geyer et al. . | |
| 5,768,551 | 6/1998 | Bleiweiss et al. | 395/311 |
| 5,781,528 | 7/1998 | Sato et al. | 370/218 |
| 5,812,754 | 9/1998 | Lui et al. | 395/182.04 |
| 5,898,828 | 4/1999 | Pignolet et al. | 395/182.04 |

*Primary Examiner*—Zarni Maung
*Attorney, Agent, or Firm*—Ratner & Prestia; H. Daniel Schnurmann

[57] ABSTRACT

A network system in which data is transferred through a bypass circuit which extends between the ends of a branch and becomes active when all the disk drives in the branch are inactivate, rather than the data being transferred through bypass circuits individually associated with the disk drives and which become active when the disk drives are inactive.

6 Claims, 2 Drawing Sheets

NETWORK SYSTEM HAVING A SECONDARY DISK DRIVE BYPASS CIRCUIT ACTIVATED WHEN ALL PRIMARY DISK DRIVE BYPASS CIRCUITS ARE ACTIVATED

TECHNICAL FIELD

The present invention relates, in general, to a network system having circuitry for bypassing inactive disk drives which are serially connected and, in particular, to hierarchical bypass circuitry by which an entire branch of a network is bypassed when all the disk drives in the branch are inactivated.

BACKGROUND OF THE INVENTION

Presently, there are many network systems having a loop architecture. Such networks preferably are arranged to allow one or more disk drives to be removed from the loop while maintaining operation of the loop. For this reason, disk drives are bypassed with a bypass circuit so that a serial loop may still transfer a signal in the event one of the disk drives is removed. When a disk drive is removed, the associated bypass circuit senses removal of the disk drive and allows data to transfer through the bypass circuit.

Bypassing a disk drive may have a detrimental effect on the performance of the loop. This is a result of the functional differences between the disk drive path and the bypass path. When the disk drive is present, the communications protocol present in the disk drive provides freshly tuned data. Thus, signal integrity of the outbound path is clean. Due to economical considerations, the bypass circuit may not provide this level of function resulting in an outbound signal which is degraded from that of the actual disk drive outbound signal. In the event that plural, serially connected disk drives are inactive and plural bypass circuits are active, signal deterioration is compounded. Some examples of signal deterioration are propagation delay, jitter, and performance degradation, as well as a reduced distance allowed between disk drives. Even if a more costly bypass circuit which includes retiming is used, there still can be unnecessary latency through the communication path.

SUMMARY OF THE INVENTION

Accordingly, a network system, constructed in accordance with the present invention, includes a host terminal for supplying data and a plurality of serially connected stations through which data from the host terminal is transferred. Each station includes a disk drive and a primary bypass circuit connected in parallel with the disk drive. The primary bypass circuits are activated when the associated disk drive is inactivated. A network system, constructed in accordance with the present invention, also includes a secondary bypass circuit for transferring data from the host terminal and bypassing the plurality of stations when all the primary bypass circuits are activated and means responsive to the primary bypass circuits for activating the secondary bypass circuit when all the primary bypass circuits are activated. A network system, constructed in accordance with the present invention, further includes means for preventing data from the host terminal from being transferred to the plurality of stations when data from the host terminal bypasses the plurality of stations through the secondary bypass circuit.

DETAILED DESCRIPTION OF THE INVENTION

Figure 1:
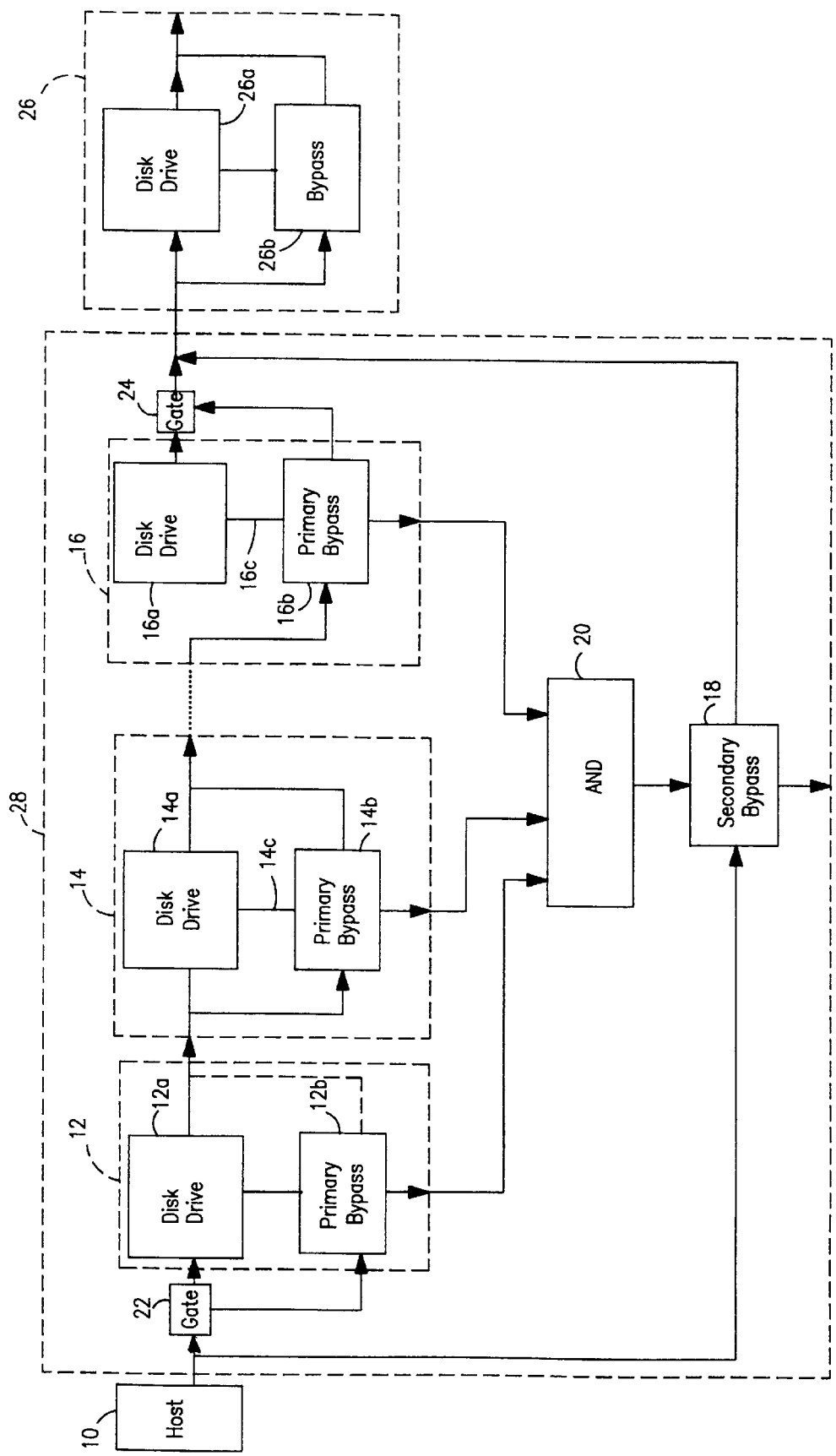
FIG. 1 is a block diagram of first and second embodiments of a network system constructed in accordance with the present invention.

Referring to FIG. 1, a first embodiment of a network system, constructed in accordance with the present invention, includes a host terminal 10, for example a computer, which supplies data and a plurality of serially connected stations 12, 14, and 16 through which data from the host terminal is transferred. Data flow can be in the opposite direction, namely from stations 12, 14, and 16 to host terminal 10.

Each station 12, 14, and 16, respectively, includes a disk drive 12a, 14a, and 16a and a primary bypass circuit 12b, 14b, and 16b connected in parallel with the associated disk drive. The disk drives and the bypass circuits can be of conventional construction and operation. The number of stations in a level of hierarchy depends upon the application of the network system.

When disk drives 12a, 14a, and 16a are active, primary bypass circuits 12b, 14b, and 16b, respectively, are inactive. The transfer of data is through disk drives 12a, 14a, and 16a to or from host terminal 10.

Primary bypass circuits 12b, 14b, and 16b are activated individually when the associated disk drives 12a, 14a, and 16a, respectively, are inactivated, for example when one or more of the disk drives is removed from the network system. Each primary bypass circuit 12b, 14b, and 16b can be activated by direct or indirect response to its associated disk drive being inactivated. Connections 12c, 14c, and 16c represent direct sensing, by primary bypass circuits 12b, 14b, and 16b, of the associated disk drives 12a, 14a, and 16a being inactivated. The transfer of data, to or from host terminal 10, is through those disk drives 12a, 14a, and 16a which remain active and those primary bypass circuits 12b, 14b, and 16b which have been activated.

A network system, constructed in accordance with the present invention, also includes a secondary bypass circuit 18 for transferring data from host terminal 10 and bypassing the plurality of stations 12, 14, and 16 when all the primary bypass circuits 12b, 14b, and 16b are activated. Secondary bypass circuit 18 can be of conventional construction and operation.

A network system, constructed in accordance with the present invention, further includes means responsive to primary bypass circuits 12b, 14b, and 16b for activating secondary bypass circuit 18 when all the primary bypass circuits are activated. Such means can be an AND circuit 20 of conventional construction and operation. When a signal is present at each of the inputs to AND circuit 20, representing all of the primary bypass circuits 12b, 14b, and 16b being activated and all of the disk drives 12a, 14a, and 16a being inactive, the AND circuit activates secondary bypass circuit 18 to transfer data to or from host terminal 10 and bypassing the plurality of stations 12, 14, and 16.

A network system, constructed in accordance with the present invention, further includes means for preventing data from host terminal 10 from being transferred to the plurality of stations 12, 14, and 16 when data from the host terminal bypasses the plurality of stations through secondary bypass circuit 18. Such means can be, for example, gates 22 and 24, respectively, located at the input to the first station 12 and at the output from the third station 16. By preventing data transfer through stations 12, 14, and 16 and, in particular through primary bypass circuits 12b, 14b, and 16b when disk drives 12a, 14a, and 16a all are inactive, propagation delay, jitter and performance degradation are lessened and overall signal integrity is improved compared to propagation delay, jitter, performance degradation, and signal integrity as data to or from host terminal 10 passes through the primary bypass circuits when the disk drives all are inactive.

According to a second embodiment of the present invention, the network system of FIG. 1 further includes an additional station 26 serially connected with stations 12, 14, and 16 beyond secondary bypass circuit 18. Station 26 includes an additional disk drive 26a and an additional bypass circuit 26b connected in parallel with disk drive 26a. Station 26 is not in the branch, identified by reference numeral 28, in which stations 12, 14, and 16 are located and not bypassed by secondary bypass circuit 18. Station 26 is another station, composed of a disk drive and a bypass circuit, in the network system, which transmits or receives data to or from station 16 or secondary bypass circuit 18.

Figure 2:
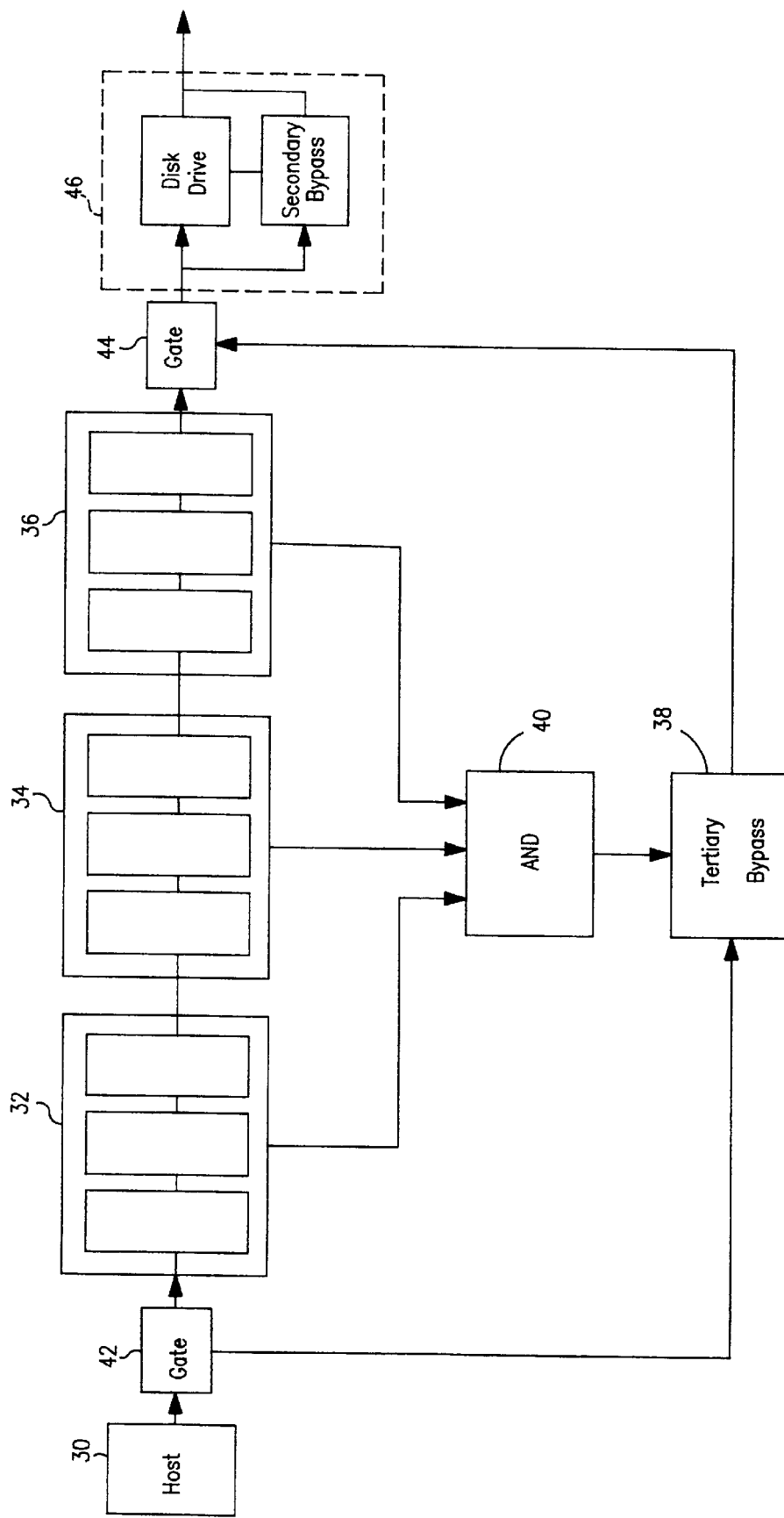
FIG. 2 is a block diagram of third and fourth embodiments of a network system constructed in accordance with the present invention.

Referring to FIG. 2, a third embodiment of a network system, constructed in accordance with the present invention, includes a host terminal 30, for example a computer, which supplies data and a plurality of serially connected network branches 32, 34, and 36. Each of the network branches includes all of the components of the first embodiment of the present invention, namely (A) a plurality of serially connected stations through which data from the host terminal is transferred, with each station including a disk drive and an associated primary bypass circuit connected in parallel with the disk drive and activated when the disk drive is inactivated, (B) a secondary bypass circuit for transferring data from the host terminal and bypassing the plurality of stations when all the primary bypass circuits are activated, (C) means responsive to the primary bypass circuits for activating the secondary bypass circuit when all the primary bypass circuits are activated, and (D) means for preventing data from the host terminal from being transferred to the plurality of stations when data from the host terminal bypasses the plurality of stations through the secondary bypass circuit. Each of the network branches 32, 34, and 36 operates in a manner identical to the branch shown in FIG. 1. As with the first and second embodiments of the present invention, each primary bypass circuit in the third embodiment can be activated by direct or indirect response to its associated disk drive being inactivated.

The third embodiment of a network system, constructed in accordance with the present invention, further includes a tertiary bypass circuit 38 for transferring data from host terminal 30 and bypassing network branches 32, 34, and 36 when all the secondary bypass circuits of the network branches are activated.

Also included in the third embodiment of a network system, constructed in accordance with the present invention, are means responsive to secondary bypass circuits of the network branches for activating tertiary bypass circuit 38 when all the secondary bypass circuits are activated. Such means can be an AND circuit 40 of conventional construction and operation. When a signal is present at each of the inputs to AND circuit 40, representing all of the primary bypass circuits in all of the network branches 32, 34, and 36 being activated and all of the disk drives in all of the network branches being inactive, AND circuit 40 activates tertiary bypass circuit 38 to transfer data to or from host terminal 30 and bypassing the plurality of network branches.

The third embodiment of a network system, constructed in accordance with the present invention, further includes means for preventing data from host terminal 30 from being transferred to the plurality of network branches 32, 34, and 36 when data from the host terminal bypasses the plurality of stations through tertiary bypass circuit 38. Such means can be, for example, gates 42 and 44, respectively, located at the input to the first network branch 32 and at the output from the third network branch 36. By preventing data transfer through network branches 32, 34, and 36 and, in particular through the secondary bypass circuits of the network branches when the disk drives all are inactive, propagation delay, jitter and performance degradation are lessened and overall signal integrity is improved compared to propagation delay, jitter, performance degradation, and signal integrity as data to or from host terminal 30 passes through the secondary bypass circuits when the disk drives of the network branches all are inactive.

According to a fourth embodiment of the present invention, the network system of FIG. 2 further includes an additional network branch 46 serially connected with network branches 32, 34, and 36 beyond tertiary bypass circuit 38. Network branch 46 can be, as shown, a single station similar in construction and operation to stations 12, 14, and 16 of FIG. 1 or network branch 46 can be composed of a plurality of stations similar to network branch 28 of FIG. 1. Network branch 46 transmits or receives data to or from network branch 36 or tertiary bypass circuit 38.

While there have been described preferred embodiments of the present invention, it should be obvious to those skilled in the art that various modifications and changes can be made without departing from the true spirit and scope of the invention.

What is claimed:

1. A network system comprising:

a host terminal for supplying data;

a plurality of serially connected stations through which data from said host terminal is transferred, each said station including:
 (a) a disk drive, and
 (b) a primary bypass circuit connected in parallel with said disk drive and activated when said disk drive is inactivated;

a secondary bypass circuit for transferring data from said host terminal and bypassing said plurality of stations when all said primary bypass circuits are activated;

means responsive to said primary bypass circuits for activating said secondary bypass circuit when all said primary bypass circuits are activated; and means for preventing data from said host terminal from being transferred to said plurality of stations when data from said host terminal bypasses said plurality of stations through said secondary bypass circuit.

2. A network system according to claim 1 wherein each said primary bypass circuit is activated in response to its associated disk drive being inactivated.

3. A network system according to claim 1 further including an additional station serially connected with said plurality of stations beyond said secondary bypass circuit and having:
 (a) an additional disk drive, and
 (b) an additional bypass circuit connected in parallel with said additional disk drive.

4. A network system comprising:

a host terminal for supplying data;

a plurality of serially connected network branches each including:

(a) a plurality of serially connected stations through which data from said host terminal is transferred, each said station including:
  (1) a disk drive, and
  (2) an associated primary bypass circuit connected in parallel with said disk drive and activated when said disk drive is inactivated,
(b) a secondary bypass circuit for transferring data from said host terminal and bypassing said plurality of stations when all said primary bypass circuits are activated,
(c) means responsive to said primary bypass circuits for activating said secondary bypass circuit when all said primary bypass circuits are activated, and
(d) means for preventing data from said host terminal from being transferred to said plurality of stations when data from said host terminal bypasses said plurality of stations through said secondary bypass circuit;
a tertiary bypass circuit for transferring data from said host terminal and bypassing said network branches when all said secondary bypass circuits are activated;
means responsive to said secondary bypass circuits for activating said tertiary bypass circuit when all said secondary bypass circuits are activated; and
means for preventing data from said host terminal from being transferred to said secondary bypass circuits when data from said host terminal bypasses said network branches through said tertiary bypass circuit.

5. A network system according to claim 4 wherein each said primary bypass circuit is activated in response to its associated disk drive being inactivated.

6. A network system according to claim 4 wherein each of said network branches further includes an additional station serially connected with said plurality of stations beyond said secondary bypass circuit and having:

(a) an additional disk drive, and (b) an additional bypass circuit connected in parallel with said additional disk drive.

* * * * *